United States Patent
Foley

(10) Patent No.: US 8,503,483 B2
(45) Date of Patent: Aug. 6, 2013

(54) SYNCHRONIZING MEDIA DATA FROM MULTIPLE DATA CHANNELS FOR IP NETWORK TRANSPORT

(75) Inventor: John Andrew Foley, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 11/797,556

(22) Filed: May 4, 2007

(65) Prior Publication Data

US 2008/0273504 A1 Nov. 6, 2008

(51) Int. Cl.
*H04J 3/06* (2006.01)

(52) U.S. Cl.
USPC ............................ 370/503; 370/476; 370/352

(58) Field of Classification Search
USPC ................. 370/476, 478, 477, 486, 537, 538, 370/542, 540, 541, 503, 352
See application file for complete search history.

(56) References Cited

U.S. PATENT DOCUMENTS

| 6,269,095 | B1 * | 7/2001 | Neubauer et al. | 370/352 |
| 6,269,107 | B1 * | 7/2001 | Jong | 370/535 |
| 6,963,590 | B1 * | 11/2005 | Mann et al. | 370/535 |
| 7,310,334 | B1 * | 12/2007 | FitzGerald et al. | 370/389 |
| 7,492,769 | B2 * | 2/2009 | Klemets | 370/392 |
| 7,620,181 | B2 * | 11/2009 | Bicksler et al. | 380/221 |
| 2006/0227706 | A1 * | 10/2006 | Burst | 370/229 |
| 2006/0268831 | A1 * | 11/2006 | Ulybin | 370/352 |

OTHER PUBLICATIONS

Rosenberg et al., "An RTP Payload Format for User Multiplexing", Internet Engineering Task Force, Internet Draft, <draft-ietf-avt-aggregation-00.txt>, May 6, 1998, pp. 1-10.

Handley, "GeRM: Generic RTP Multiplexing", Internet Engineering Task Force, Internet Draft, <draft-ietf-avt-germ-00.txt>, Nov. 11, 1998, pp. 1-8.

El-Khatib et al., "Multiplexing Scheme for RTP Flows between Access Routers" <draft-ietf-avt-multiplexing-rtp-01.txt>, Internet Engineering Task Force, Internet Draft, Oct. 22, 1999, pp. 1-13.

Subbiah et al., "User Multiplexing in RTP payload between IP Telephony Gateways", AVT Working Group, Internet Engineering Task Force, Internet Draft, <draft-ietf-avt-mux-rtp-00.txt>, Aug. 21, 2998, pp. 1-17.

Thompson et al., Tunneling multiplexed Compressed RTP ("TCRTP"), Audio/Video Transport Working Group, Internet Draft, <draft-ietf-avt-tcrtp-04.txt>, Jul. 19, 2001, pp. 1-14.

Pazhyannur et al., "Multiplexing Compressed RTP/UDP Packets in a PPP Frame", Internet Engineering Task Force, Internet Draft, <draft-pazhyannur-avt-pppmux-00.txt>, Jun. 22, 1999, pp. 1-7.

Rosenberg et al., "Issues and Options for an Aggregation Service within RTP", Audio-Video Transport Working Group, Internet Engineering Task Force, Internet Draft, Nov. 26, 1996, pp. 1-20.

(Continued)

*Primary Examiner* — Dady Chery
(74) *Attorney, Agent, or Firm* — Leon R. Turkevich

(57) ABSTRACT

In one embodiment, a method comprises receiving by a gateway a plurality of data streams via respective data channels; identifying by the gateway, from among the data streams, selected data streams for aggregation based on the selected data streams each having a same encoding type and destined for a same destination gateway; and synchronizing the selected data streams by the gateway based on: successively sampling a prescribed group of bits from each of the selected data streams at a corresponding sampling time interval, aggregating the sampled groups of bits, having been sampled from the selected data streams at the corresponding sampling time interval, into an IP media packet payload, and outputting a corresponding IP media packet, containing the IP media packet payload for the corresponding sampling time interval, to the destination gateway via an IP network.

26 Claims, 5 Drawing Sheets

(56) References Cited

OTHER PUBLICATIONS

Tanigawa et al., "Simple RTP Multiplexing Transfer Methods for VoIP", Internet Draft, <draft-tanigawa-rtp-multiplex-01.txt>, Nov. 18, 1998, pp. 1-11.

Westberg et al., "Realtime Traffic over Cellular Access Networks", <draft-westberg-realtime-cellular-00.txt>, Network Working Group, Internet Draft, Jun. 21, 1999, pp. 1-9.

Koren et al., Tunneled multiplexed Compressed RTP ("TCRTP"), Audio/Video Transport Working Group, Internet Draft, <draft-wing-avt-tcrtp-00.txt>, Jun. 25, 1999, pp. 1-21.

Handley et al., "SIP: Session Initiation Protocol", Network Working Group, Request for Comments: 2543, Mar. 1999, pp. 1-153.

Andreasen et al., "Media Gateway Control Protocol (MGCP) Version 1.0", Network Working Group, Request for Comments: 3435, Jan. 2003, pp. 1-210.

Schulzrinne et al., "RTP: A Transport Protocol for Real-Time Applications", Network Networking Group, Request for Comments: 3550, Jul. 2003, pp. 1-88.

Schulzrinne et al., "RTP Profile for Audio and Video Conferences with Minimal Control", Network Working Group, Request for Comments: 3551, Jul. 2003, pp. 1-38.

Kreuter, "RTP Payload Format for a 64 kbit/s Transparent Call", Network Working Group, Request for Comments: 4040, Apr. 2005, pp. 1-8.

Thompson et al., "Tunneling Multiplexed Compressed RTP (TCRTP)", Network Working Group, Request for Comments: 4170, Nov. 2005, pp. 1-24.

ITU-T Recommendation H.221, "Infrastructure of audiovisual services—Transmission multiplexing and synchronization: Frame structure for a 64 to 1920 kbit/s channel in audiovisual teleservices", *Series H: Audiovisual and Multimedia Systems*, Mar. 2004, pp. i-iv and 1-47 (54 total pages).

ITU-T Recommendation H.244, "Synchronized Aggregation of Multiple 64 or 56 kbit/s Channels", *Transmission of Non-Telephone Signals*, Jul. 1995, pp. i and 1-25 (28 total pages).

ITU-T Q.931 Amendment 1, "ISDN user-network interface layer 3 specification for basic call control, Amendment 1: Extensions for the support of digital multiplexing equipment", *Series Q: Switching and Signalling, Digital subscriber Signalling System No. 1—Network layer*, Dec. 2002, pp. i-iv and 1-17 (23 total pages).

ITU-T Recommendation H.320, "Narrow-band visual telephone systems and terminal equipment", *Series H: Audiovisual and Multimedia Systems*, Mar. 2004, pp. i-iii and 1-26 (29 total pages).

\* cited by examiner

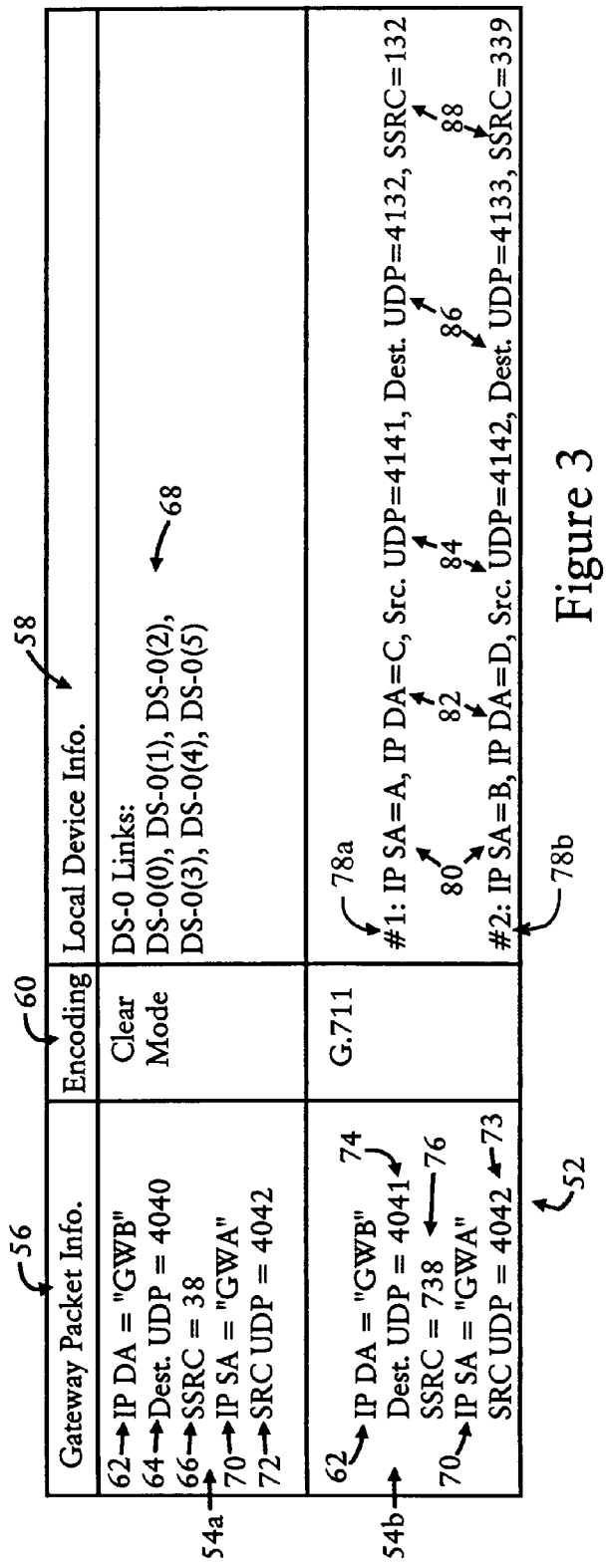
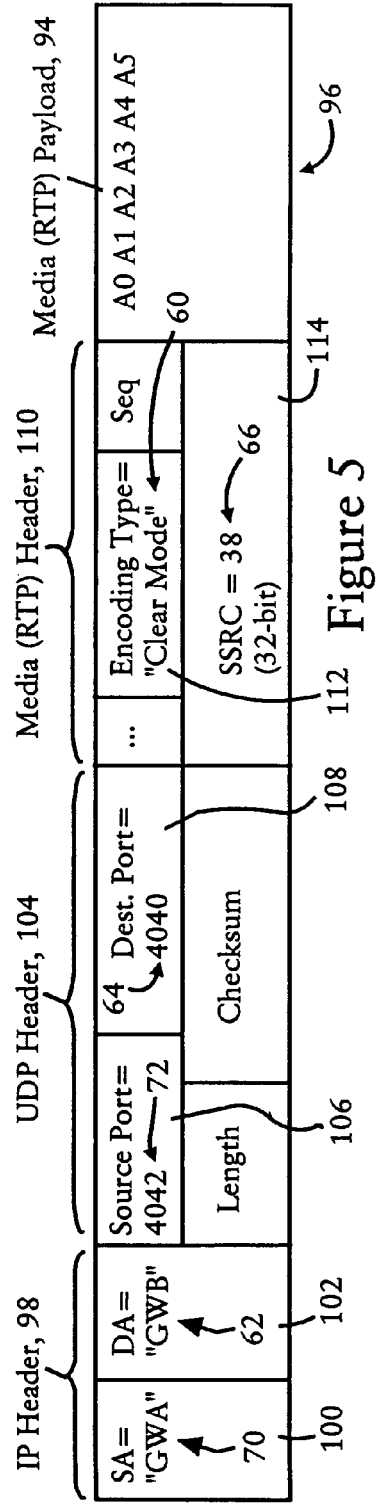
Figure 3
Figure 5

SYNCHRONIZING MEDIA DATA FROM MULTIPLE DATA CHANNELS FOR IP NETWORK TRANSPORT

TECHNICAL FIELD

The present disclosure generally relates to tandem switching of media data traffic from multiple data channels, for example time division multiplex (TDM) channels, across a Voice over IP (VoIP) network.

BACKGROUND

Transmission of a high data rate data stream, for example a 384 kilobit per second (kbps) video stream generated by a video device at a customer premises, often can require demultiplexing the high data rate data stream from a single high data rate link onto multiple digital links using an inverse multiplexer. For example, an inverse multiplexer receives a data stream from a single high-speed link, samples from the high-speed link a prescribed group of prescribed data units for a given sampling interval (i.e., a time slice), and outputs the sampled data units onto multiple lower data rate communication links, where each of the prescribed data units for the given sampling interval are output on a corresponding output link (e.g., a 64 kbps DS-0 clear channel circuit). The prescribed data units on the respective lower data rate communication links can then be supplied, on a per time slice basis, to a time division multiplexed (TDM) switch that multiplexes the data from the multiple low-speed data links onto a high-speed link (e.g., a PRIT1 or E1 trunk) for transmission via a circuit-switched network, for example the public switched telephone network. For example, the International Telecommunications Union Standardization Sector (ITU-T) Recommendation H.244 (1995), entitled "Transmission of Non-Telephone Signals—Synchronized Aggregation of Multiple 64 or 56 kbit/s Channels" provides a specification for a Channel Aggregation Unit to synchronize between a single high data rate link and multiple DS-0 circuits for transport via a switched digital network. Recommendation H.244, however, requires that data framing is performed according to ITU-T Recommendation H.221 (1993), "Frame Structure for a 64 to 1920 kbit/s Channel in Audiovisual Teleservices."

BRIEF DESCRIPTION OF THE DRAWINGS

Reference is made to the attached drawings, wherein elements having the same reference numeral designations represent like elements throughout and wherein:

FIG. 3 illustrates an example mapping table from the gateway of FIG. 2, according to an example embodiment.

FIG. 5 illustrates an example media packet output by the gateway of FIG. 2 carrying aggregated media channel data, according to an example embodiment.

DESCRIPTION OF EXAMPLE EMBODIMENTS

OVERVIEW

Figure 1:
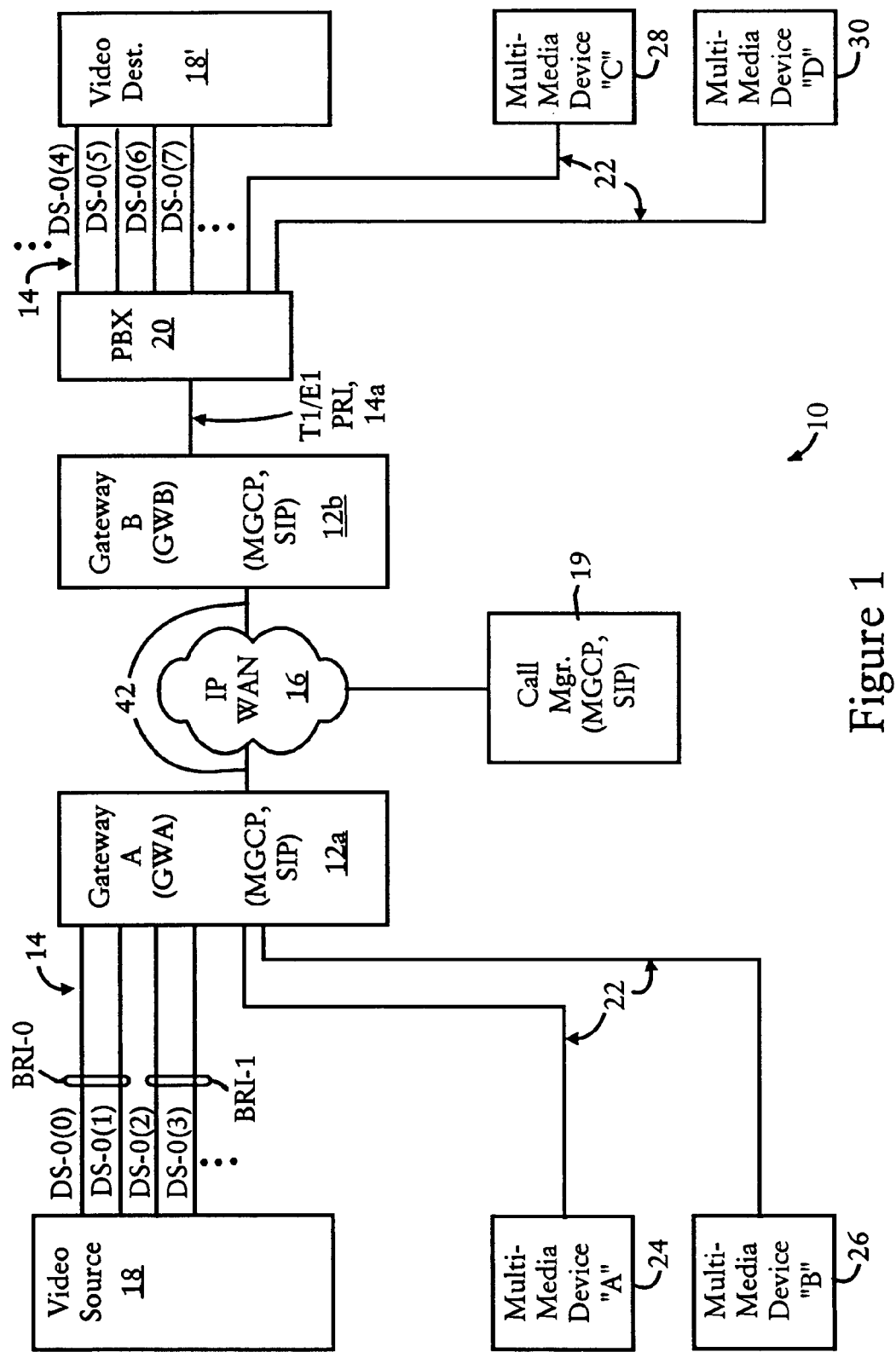
FIG. 1 illustrates an example system having gateways providing synchronized transport of media channel data between media terminal devices via an IP network, according to an example embodiment.

In one embodiment, a method comprises receiving by a gateway a plurality of data streams via respective data channels; identifying by the gateway, from among the data streams, selected data streams for aggregation based on the selected data streams each having a same encoding type and destined for a same destination gateway; and synchronizing the selected data streams by the gateway based on: successively sampling a prescribed group of bits from each of the selected data streams at a corresponding sampling time interval, aggregating the sampled groups of bits, having been sampled from the selected data streams at the corresponding sampling time interval, into an IP media packet payload, and outputting a corresponding IP media packet, containing the IP media packet payload for the corresponding sampling time interval, to the destination gateway via an IP network.

In another embodiment, a method comprises receiving, by a gateway from a source gateway via an IP network, an IP media packet having a header and an IP media packet payload; identifying, by the gateway, synchronized data streams to be output by the gateway via respective data channels in response to parsing the header; and synchronously outputting by the gateway onto the data channels the respective synchronized data streams based on sampling in sequence successive prescribed groups of bits from the IP media packet payload, and synchronously outputting the successive prescribed groups of bits onto the respective data channels relative to a synchronous output interval.

In yet another embodiment, an apparatus comprises a data channel interface circuit configured for receiving a plurality of data streams via respective data channels; an IP interface circuit configured for outputting an IP media packet to a destination gateway via an IP network; and a synchronous translation circuit. The synchronous translation circuit is configured for identifying, from among the data streams, selected data streams for aggregation based on the selected data streams each having a same encoding type and destined for the destination gateway, and synchronizing the selected data streams based on successively sampling a prescribed group of bits from each of the selected data streams at a corresponding sampling time interval, aggregating the sampled groups of bits having been sampled from the selected data streams at the corresponding sampling time interval into an IP media packet payload, and generating the IP media packet, containing the IP media packet payload the corresponding sampling time interval, for output by the IP interface circuit to the destination gateway via the IP network.

In yet another embodiment, an apparatus comprises a data channel interface circuit configured for receiving a plurality of data streams via respective data channels; an IP interface circuit configured for outputting an IP media packet to a destination gateway via an IP network; and a synchronous translation circuit. The synchronous translation circuit is configured for identifying, from among the data streams, selected data streams for aggregation based on the selected data streams each having a same encoding type and destined for the destination gateway, and synchronizing the selected data streams based on successively sampling a prescribed group of bits from each of the selected data streams at a corresponding sampling time interval, aggregating the sampled groups of bits having been sampled from the selected data streams at the corresponding sampling time interval into an IP media packet payload, and generating the IP media packet, containing the IP media packet payload the corresponding sampling time interval, for output by the IP interface circuit to the destination gateway via the IP network.

DETAILED DESCRIPTION

Particular embodiments enable multiple data streams that are transmitted on respective data channels to be multiplexed for transmission via an IP network, without loss of synchronization due to transport of the multiplexed data streams across the IP network. The multiple data streams, received by a gateway on the respective data channels, are identified for aggregation based on each of the multiple data streams sharing attributes, for example the same identified source, the same identified destination (e.g., the same destination gateway or the same destination device), and/or having the same encoding type. The data streams transmitted on the data channels that are identified or selected as belonging to the aggregated data stream are successively sampled at a corresponding sampling time interval (e.g., a prescribed time slot or time slice), in order to obtain a sampled group of data bits from each selected data channels, each sampled group of bits sampled from a corresponding data channel at a corresponding sampling time interval (e.g., a prescribed time slot or time slice). The selected data streams are synchronized based on aggregating the sampled group of bits from the selected data channels at the corresponding time slot into the payload of a single IP-based media packet, for transmission to the identified destination via an IP network.

Example embodiments of the gateway can add the payload into a real-time transport protocol (RTP) packet in accordance with the Internet Engineering Task Force (IETF) Request for Comments (RFC) 3550, where the sampled groups of bits are added as "raw" data (i.e., unencoded data) as illustrated, for example, as "clear-channel data" in RFC 4040. In other words, the gateway can use a "clear channel" codec that inserts the sampled groups of bits as "clear-channel data" into the IP packet payload without encoding or compression. Hence, the gateway can use the clear channel codec, also referred to as a "G.Clear" codec, to tandem switch the data channels (e.g., ISDN bearer circuits) through an IP network such as a Voice over IP (VoIP) network having IP-based PRI trunks. Example gateways that utilize a "G.Clear" codec include the commercially-available Cisco® AS5350, AS5350XM, AS5400, AS5400HPX, and AS5850 Series Universal Gateways, the Cisco® 3700 Series Multiservice Access Routers, the Cisco® 2800 and 3800 Series Integrated Service Routers, all commercially available from Cisco Systems, Inc., San Jose, Calif.

Hence, a destination gateway in communication with the identified destination is able to receive the IP media packet for the given sampling time interval via the IP network, identify the synchronized data streams that are to be output by the gateway via the respective data channels based on header information in the IP media packet, and synchronously output the respective synchronized data streams based on sampling in sequence the successive prescribed groups of bits from the IP media packet payload, and synchronously outputting the successive prescribed groups of bits onto the respective data channels relative to a synchronous output interval.

As will become apparent from the following description, particular embodiments provide the synchronizing of selected data streams based on aggregating the sampled groups of bits from different data channels into a single IP media packet payload, which enables the data streams to maintain time synchronization relative to each other by a destination gateway that recovers the sampled groups of bits from the single IP media packet payload, despite the fact that IP media packets carrying the sampled groups of bits from different sampling time intervals may traverse the IP network via different routing paths. Hence, time synchronization between the selected data streams can be recreated by the destination gateway, without the necessity of deploying synchronization protocols such as ITU-T Recommendation H.221. Further, the synchronizing of selected data streams can be implemented independent of whether the data streams are supplied via time division multiplexed data channels (e.g., a 64 kbps DS-0 channel, a 1.544 Mbps DS-1 or T1 channel, or a 2.048 Mbps E1 channel), or packet switched channels (e.g., IP over Ethernet, etc.).

FIG. 1 is a diagram illustrating an example system 10 having Voice over IP gateways 12a and 12b for providing transport of synchronized media data from multiple data channels 14 via an IP network 16, according to an example embodiment. Each of the gateways 12a and 12b are configured for synchronizing selected data streams having been generated from customer premises terminal devices 18, 24, or 26 for transport via the IP network (e.g., a wide area network (WAN)) 16. For example, the video source 18 can be implemented as a video device configured for initiating multiple concurrent telephone calls with a call manager 19 for simultaneous transport of data streams via the data channels 14, implemented for example as time division multiplexed data channels such as DS-0 links. In particular, the video source 18 can simultaneously supply 64 kbps data streams on six (6) DS-0 data channels 14 in order to transport the 384 kbps video stream. The gateway 12a, in response to receiving the data streams via the respective DS-0 data channels 14, prepares the data streams for transport via the IP network 16 based on call set up information supplied by the call manager 19, for example according to Media Gateway Control Protocol (MGCP) as described in RFC 3435, or Session Initiation Protocol (SIP) as described in RFC 2543.

Although the RFC 3550 describes RTP for transport of real-time applications such as audio and video, RFC 3550 also describes multiplexing RTP sessions in section 5.2, where in a teleconference composed of audio and video data encoded separately, each medium should be carried in a separate RTP session with its own destination transport address. Hence, ordinarily each of the data streams received by the separate DS-0 data channels 14 would be transported via its own corresponding RTP stream across the IP network 16. However, transport of the data streams received via the separate DS-0 data channels 14 as separate RTP data streams can result in loss of synchronization during transport via the IP network 16, because the IP network 16 operates as a packet switched network that does not guarantee delivery of packets in a particular order or relative to any timing synchronization; in contrast, time division multiplexed channels such as the DS-0 channels 14, and higher data rate channels such as Primary Rate Interface (PRI) channels T1 or E1 14a synchronize data channels by applying a time slot interchange to ensure the data bits transmitted on the TDM channels 14 and 14a are synchronized relative to a particular time slice.

The example embodiment maintains the synchronization between the multiple data channels 14, ensuring that the bonded (i.e., synchronized) data streams on the multiple data channels 14 remain synchronized based on sampling groups of bits from each of the data channels 14 identified as requiring synchronized aggregation at a corresponding sampling time interval (e.g., a corresponding time slice of the TDM DS-0 channel), and aggregating the sampled groups of bits from the selected data streams for the corresponding sampling time interval into a single IP media packet payload for transport in an IP media packet to a destination gateway 12b via the IP network 16.

The destination gateway 12b, having received the relevant call set up information from the call manager 19, receives the IP media packet and can identify the synchronized data streams based on the call set up information and parsing the IP media packet header identifying the media packet as associated with the multi-source call. The destination gateway 12b can sample in sequence the successive prescribed groups of bits from the IP media packet payload, and synchronously output the successive prescribed groups of bits onto the respective data channels relative to a synchronous output interval, preserving the synchronization between the respective data channels. As illustrated in FIG. 1, the gateway 12b can multiplex the data channels receiving the prescribed groups of bits onto a timed multiplexed link 14a implemented, for example as a PRI T1 or E1 channel 14a, enabling demultiplexing of the channels by a local TDM switch 20, for example a private branch exchange (PBX) 20 providing the lower speed DS-0 data channels 14 to a video destination device 18'.

FIG. 1 also illustrates that the gateway 12a also can synchronize (i.e., perform bonding of) data streams from non-TDM-based data channels 22, for example Ethernet links providing IP-based services such as voice over IP, enabling the RTP data stream output by the multimedia device 24 (e.g., a video phone) to be synchronized with the RTP data stream output by the multimedia device 26 (e.g., a second video feed), enabling the synchronous transport via the IP network 16 to guarantee synchronous reception by the multimedia devices 28 and 30. The multimedia device 24 also can be a video phone implemented according to ITU-T Recommendation H.320 but that does not need to internally implement the framing requirements of ITU-T H.221. Hence, the data streams from any one of the media sources 18, 24 or 26 can be synchronized (i.e., bonded) by the gateway 12a based on sampling a group of bits from each of the data streams at a corresponding sampling time interval, aggregating the sampled groups of bits into a single IP media packet payload, for transport via the IP network 16 and synchronous reconstruction of the media streams by the destination gateway 12b.

Figure 2:
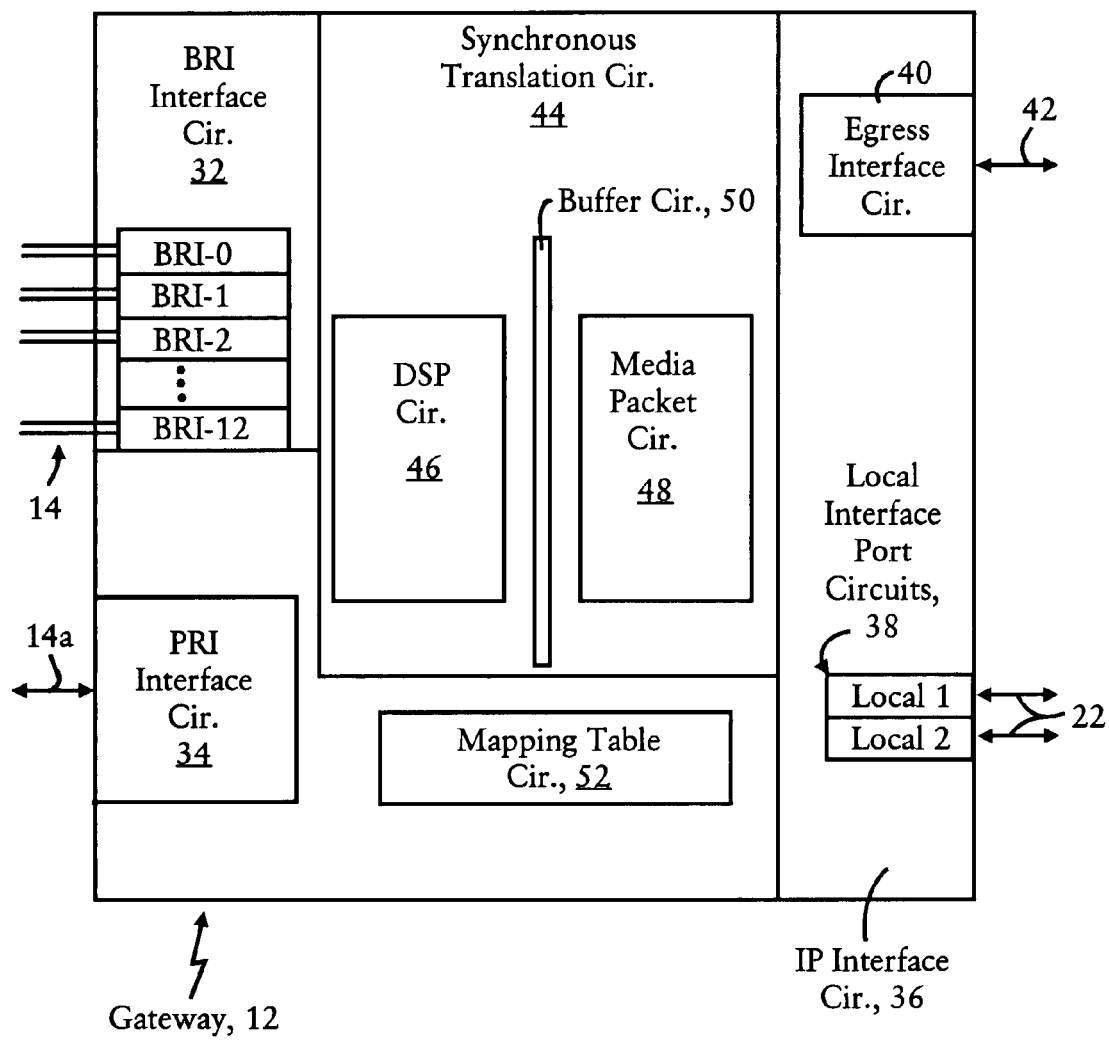
FIG. 2 illustrates an example gateway from the system of FIG. 1, according to an example embodiment.

FIG. 2 is a diagram illustrating an example gateway 12 according to an example embodiment. The gateway 12 of FIG. 2 illustrates the gateways 12a and 12b of FIG. 1. In particular, the gateways 12a and 12b are identical except for the specific interfaces which can be used for sending and receiving the data streams to and from the local media devices. For example, the gateway 12 of FIG. 2 can include a basic rate interface (BRI) circuit 32 as illustrated by the gateway 12a, and/or a primary rate interface (PRI) circuit 34 as illustrated by the gateway 12b. Each of the TDM-based interface circuits 32 and 34 are configured for sending and receiving data to and from a device according to the existing telephony protocols for BRI and PRI interfaces. As illustrated in FIG. 2, the data channel interface circuits 32 and 34 can send and receive a plurality of data streams via respective data channels, for example the DS-0 channels 14 or the T1/E1 PRI channels 14a. The gateway 12 can be implemented, for example, using any one of the commercially-available Cisco® AS5350, AS5350XM, AS5400, AS5400HPX, and AS5850 Series Universal Gateways or 2800, 3700 or 3800 Series Routers, and the call manager 19 can be implemented using a "soft switch" such as the commercially-available Cisco® Unified CallManager (also referred to as the Cisco Unified Communications Manager) from Cisco Systems, Inc., San Jose, Calif.

The gateway 12 also includes an IP interface circuit 36 that can include local IP interface circuits 38, for example 10/100/1000 Mbit/s Ethernet interfaces configured for sending and receiving data via Ethernet links 22, and an egress IP interface circuit 40 configured for sending and receiving IP data packets to and from the IP network 16 via a high-speed trunk connection 42, for example a T1/E1 trunk connection.

The gateway 12 also includes a synchronous translation circuit 44 that can include a digital signal processing (DSP) circuit 46, a media packet circuit 48, and buffer circuits 50. The DSP circuit 46 can be configured for sending and receiving data streams to and from the BRI interface circuit 32 and/or the PRI interface circuit 34 according to the existing telephony-based switching technology. For example, the DSP circuit 46 can include a time slot interchange (TSI) configured for outputting data streams to the BRI interface circuit 32 or the PRI interface circuit 34 according to the appropriate time slice for the TDM channel. For example, the DSP circuit 46 can output for a given DS-0 circuit a data byte (eight bits) at a corresponding time slice rate of 8000 times per second (i.e., 8000 frames per second); since a BRI interface can include two DS-0 bearer channels and one signaling data channel (2B+D), the DSP circuit 46 can output a data byte on each of the 24 DS-0 links 14 for each time slice, and sample a data byte from each of the 24 DS-0 links 14 at a given time slice (full duplex). Similarly, the DSP circuit 46 can multiplex the 24 DS-0 links 14 onto the PRI interface circuit 34 at a data rate of 1.544 Mb per second (T1), or 2.048 Mb per second (E1).

The media packet circuit 48 can be configured for creating RTP data streams according to RFC 3550 based on the DSP circuit 46 sampling from the BRI interface circuit 32 or the PRI interface circuit 34, and parsing received RTP data streams from the IP interface circuit 36 and supplying the RTP payload to the BRI interface circuit 32 or the PRI interface circuit 34, as appropriate. As described below, the media packet circuit 48 can identify selected data streams from the data channels 14 for output by the IP interface circuit 36 for aggregation into an RTP data packet based on call set up information stored in a mapping table 52, illustrated in FIG. 3. Data can be stored temporarily between the DSP circuit 46 and the media packet circuit 48 in a buffer circuit 50.

Any of the disclosed circuits of the gateway 12 (including the BRI interface circuit 32, the PRI interface circuit 34, the IP interface circuit 36, the synchronous translation circuit 44, and their associated components) can be implemented in multiple forms, including hardware logic that can be implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal memory (e.g., within a memory circuit within the gateway 12) causes the processor to store application state variables in processor memory, creating an executable application resource (e.g., an application instance) that performs the operations of the circuit as described herein. Hence, use of the term "circuit" in this specification refers to both a hardware-based circuit that can include logic for performing the described operations, or a software-based circuit that can include a reserved portion of processor memory for storage of application state data and application variables that are modified by execution of the executable code by a processor. The memory circuit 50 and mapping table circuit 52, as well as any other memory circuits that can be employed to implement the gateway 12, can be implemented as a non-volatile memory, for example an EPROM, a DRAM, etc.

Further, any reference to "outputting a message", or "outputting a packet", or "outputting a prescribed group of bits" (e.g., a data byte) can be implemented based on creating the message/packet/group of bits in the form of a data structure and storing that data structure in a tangible memory medium in the disclosed apparatus (e.g., in a transmit buffer), and electrically transmitting (e.g., via wired electric current or wireless electric field, as appropriate) the message/packet/data stream stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

FIG. 3 is a diagram illustrating a mapping table 52 according to an example embodiment. The mapping table 52 can be configured for storing mapping entries 54 for each call to be handled by the gateway 12. For example, the mapping entry 54a can identify gateway packet information 56, local device information 58, and encoding type 60. The mapping table entry 54a can be created during call set up based on information received from the call manager 19 of FIG. 1. In particular, the gateway packet information 56 for the mapping entry 54a specifies the IP destination address 62 of the gateway 12b, a User Datagram Protocol (UDP) destination port 64 to be used in identifying the media stream to the destination gateway 12b, and a synchronization source (SSRC) identifier value 66 that uniquely identifies the RTP media streams for the destination gateway 12b (the gateway packet information 56 also can store the IP source address 70 and the source UDP port 72 for the gateway 12a). The local device information 58 identifies the local data channels (e.g., 14, 22) to be used in communicating with the local source or destination media device. Hence, the local device information 58 for the mapping table entry 54a can include link identifiers 68 that identify the DS-0 links "DS-0(0)", "DS-0(1)", "DS-0(2)", "DS-0(3)", "DS-0(4)", and "DS-0(5)" 14 to be used in sending and/or receiving data streams to or from the local device 18.

The mapping table entry 54b can store the gateway packet information 56 and the local device information 58 during call set up of an IP-based call, for example a multiplexed IP based communication between the local device 24 and the remote device 28 using a first media stream ("#1"), and the local device 26 and the remote device 30 using a second media stream ("#2"), where the first ("#1") and second ("#2") media streams output by the respective local devices 24 and 26 need to be synchronous. In this case, the gateway packet information 56 for the mapping table entry 54b can specify the same IP destination address 62 and IP source address 70, and the UDP destination port 74 for the corresponding synchronized media streams and the SSRC identifier 76. The corresponding local device information 58 for the mapping table entry 54b identifies the local media stream parameters 78a and 78b for the respective streams ("#1" and "#2") output by the devices 24 and 26, namely the respective IP source address values 80 of the devices 24 and 26, the respective IP destination address values 82 of the remote devices 28 and 30, the respective source UDP port values 84 for the local devices 24 and 26, the respective destination UDP port values 86 for the media devices 28 and 30, and the respective SSRC values 88 used by the first media stream ("#1") between the devices 24 and 28, and the second media stream ("#2") between the devices 26 and 30. The mapping table entry 54b also can include an encoding type 60, illustrated for example as ITU-T G.711, although other encoding formats such as clear mode or G.729 can be applied, as established during call set up. Other encoding formats that can be applied and identified in the encoding type field 60 are illustrated in RFC 3551. As recognized in the art, the destination gateway 12b has a corresponding set of gateway packet information 56 and local device information 58, enabling the gateway 12b to transfer between the RTP packet streams sent and received via the IP network 16, and the local data streams that are transferred to or from the local devices 18', 28 or 30 via the time multiplexed link 14a coupled to the gateway 12b.

Hence, the media packet circuit 48 of FIG. 2 can be configured for identifying selected data streams for aggregation based on call setup information stored in the mapping table 52, including identifying data streams from the same source (e.g., 18), destined for the same destination (e.g., 18', 28 or 30) or at least the same destination gateway 12b, and whether the selected data streams utilize the same encoding (e.g., clear channel, also referred to as clear mode) 60.

Figure 4:
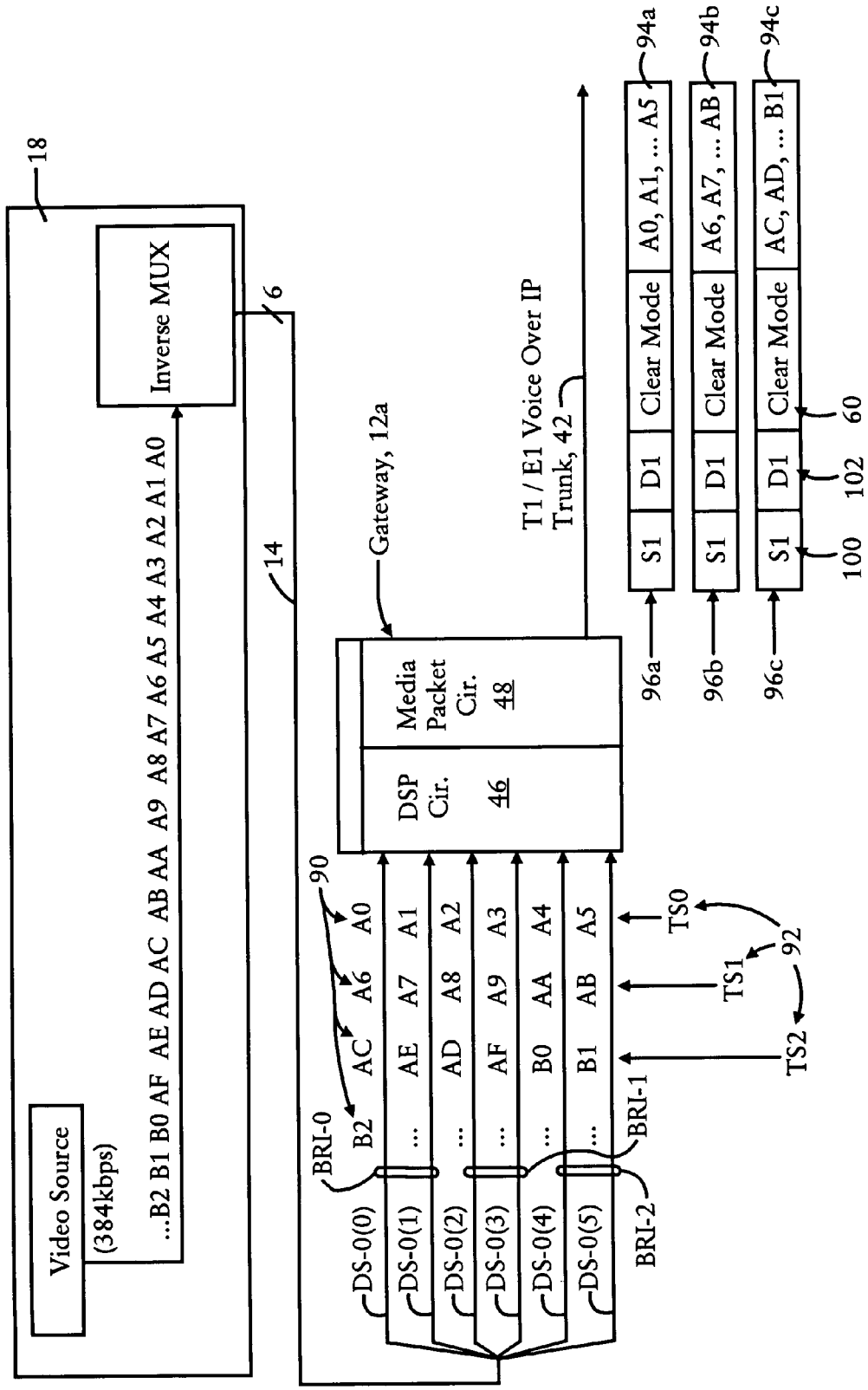
FIG. 4 illustrates an example aggregation of media channel data by the system of FIG. 1 according to an example embodiment.

FIG. 4 illustrates an example aggregation of media channel data by the system of FIG. 1. As illustrated in FIG. 4, the media packet circuit 48, in response to the DSP circuit 46 sampling the group of bits (e.g., data bytes A0, A1, A2, A3, A4, and A5) 90 from each identified data stream on the corresponding data channel (e.g., "DS-0(0)", "DS-0(1)", "DS-0(2)", "DS-0(3)", "DS-0(4)", and "DS-0(5)") 14 for each corresponding sampling time interval (e.g., TS0) 92, aggregates the sampled groups of bits into an IP media packet payload 94, illustrated in FIGS. 5 and 6. Hence, as illustrated in FIG. 4, the data bytes represented by the hexadecimal values A0, A1, A2, A3, A4, and A5 are sampled at the sampling time interval "TS0" 92 by the DSP circuit 46 from the respective data channels "DS-0(0)", "DS-0(1)", "DS-0(2)", "DS-0(3)", "DS-0(4)", and "DS-0(5)" 14, causing the media packet circuit 48 to aggregate the sampled data bytes A0, A1, A2, A3, A4, and A5 90 having been sampled at the sampling time interval "TS0" 92 into the media packet payload 94a of FIG. 4 for transport in the media packet 96a; the data bytes represented by the hexadecimal values A6, A7, A8, A9, AA, and AB 90 are sampled at the sampling time interval "TS1" 92 by the DSP circuit 46 from the respective data channels "DS-0(0)", "DS-0(1)", "DS-0(2)", "DS-0(3)", "DS-0(4)", and "DS-0(5)" 14, causing the media packet circuit 48 to aggregate the sampled data bytes A6, A7, A8, A9, AA, and AB 90 into the IP media packet payload 94b for transport in the media packet 96b; the data bytes represented by the hexadecimal values AC, AD, AE, AF, B0, and B1 90 are sampled at the sampling time interval "TS2" 92 by the DSP circuit 46 from the respective data channels "DS-0(0)", "DS-0(1)", "DS-0(2)", "DS-0(3)", "DS-0(4)", and "DS-0(5)" 14, causing the media packet circuit 48 to aggregate the sampled data bytes AC, AD, AE, AF, B0, and B1 90 into the IP media packet payload 94c for transport in the media packet 96c.

Hence, the synchronization of the sampled groups of bits 90 relative to the identified data channels 14 at a given sampling time interval 92 (e.g., time slice "TS0") is preserved based on aggregating the sampled groups of bits for a given sampling time interval 92 within a single media packet 96. Although for clarity T1 framing has not been described with respect to FIG. 4, those skilled in the art will know how to apply the example aggregation illustrated in FIG. 4 to account for T1 framing, for example superframe (D4) or extended superframe (ESF).

FIG. 5 is a diagram illustrating an example media packet 96 generated by the media packet circuit 48, according to an example embodiment. The media packet 96 includes an IP header 98 including a source address field 100 specifying the source address 70 of the gateway 12a, and a destination address field 102 specifying the destination address 62 of the destination gateway 12b; the media packet 96 also can include a UDP header 104 that includes a source port field 106 specifying the appropriate source UDP port value 72 or 73, and a destination port field 108 specifying the appropriate destination UDP port value 64 or 74.

The media packet 96 also can include a media header 110, for example an RTP header as specified in RFC 3550, that includes an encoding type field 112 (referred to as a payload type in RFC 3550) that specifies the corresponding encoding type 60, and can also include an identifier such as the 32-bit SSRC identifier 114. Depending on implementation, any one of the source port field 106, destination port field 108, and/or SSRC field 114 can be used to uniquely identify the media packet to the destination gateway 12b, depending on the call setup information stored in the corresponding mapping table 52; hence, any of these identifiers can be used singly or in combination to identify a single destination device, a single data stream, or in aggregate of multiple data streams, each having their own corresponding SSRC values 88 as illustrated in table entry 54b of FIG. 3.

Hence, the media packet circuit 48 in the destination gateway 12b has sufficient information to identify the synchronized data streams that need to be output by the gateway 12b and the respective data channels to be used in the corresponding attached link 14a in transporting the synchronized data streams to the PBX switch 20, for delivery to the appropriate destination terminals 18', 28 or 30.

Figure 6:
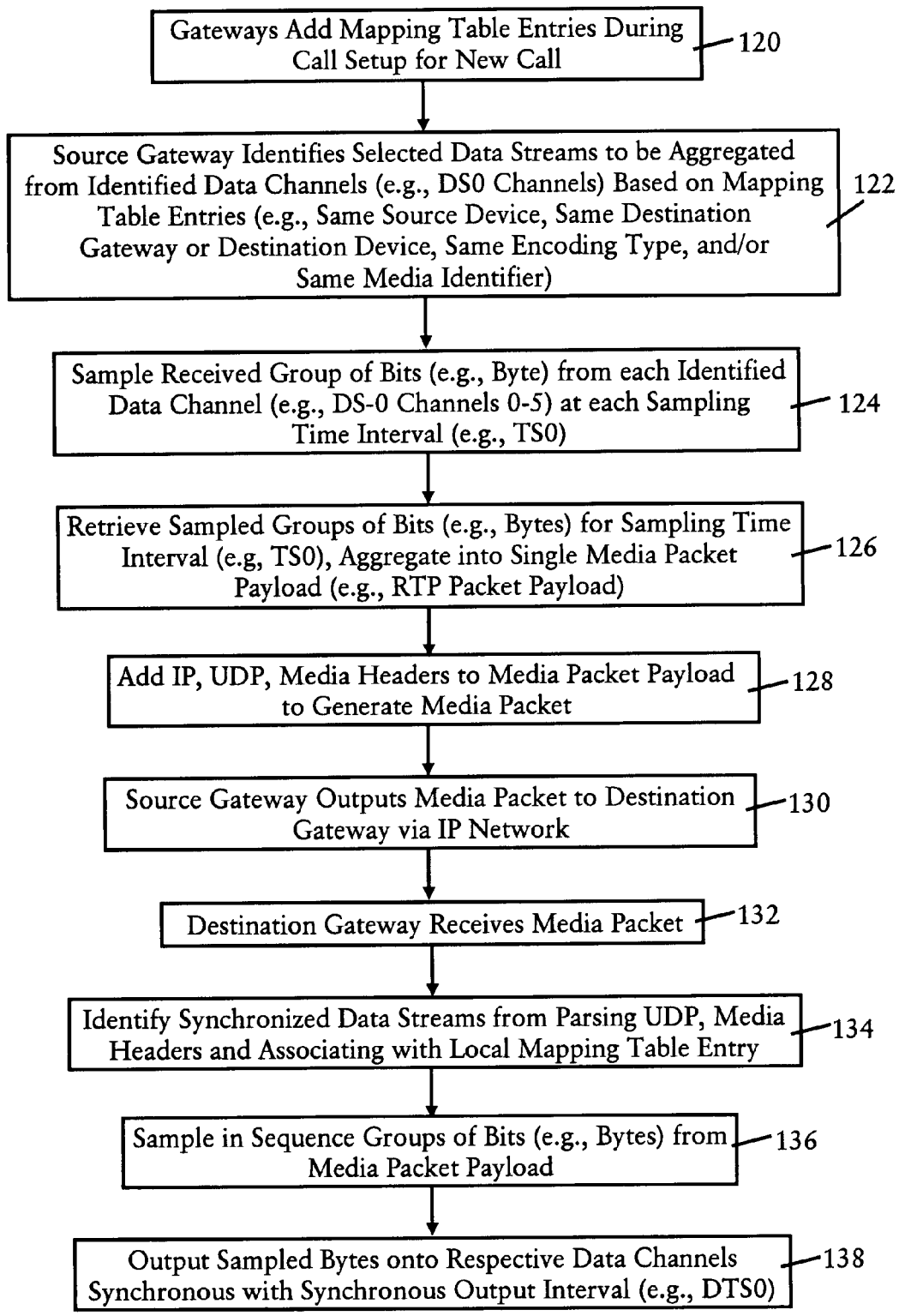
FIG. 6 illustrates an example method by the gateways of FIGS. 1 and 2 of providing the synchronized transport of media channel data, according to an example embodiment.

FIG. 6 illustrates an example method by the gateways of FIGS. 1 and 2 of providing the synchronized transport of media channel data, according to an example embodiment. The steps described in FIG. 6 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The method begins in step 120, where each of the media packet circuits 48 populate the respective mapping tables 52 with mapping table entries (e.g., 54a, 54b) in response to prescribed call setup procedures by the call manager 19 based on a call initiation request from a terminal media device (e.g., 18, 18', 24, 26, 28, or 30). As recognized in the art, the call setup procedures can be performed according to MGCP or SIP, as appropriate. Alternate call setup procedures can be implemented that do not rely on the call manager 19, for example based on static provisioning of the mapping tables 52 by a network administrator, or based on peer-to-peer call setup operations performed between the gateways 12a and 12b. Following call setup, the gateways 12a and 12b can begin full-duplex media transport of media data via the IP network 16, for example by transporting media packets according to RTP protocol as specified in RFC 3550. Although actual implementation will use full-duplex communications between the gateways 12a and 12b, a single path of communication from the gateway 12a toward the gateway 12b will be illustrated for simplicity; further, well known signaling techniques will be omitted to simplify the description.

Based on receiving the call setup information and storage in the mapping table 52 in step 120, the synchronous translation circuit 44 in the gateway 12a can identify in step 122 the selected data streams to be aggregated: according to the example embodiment, the minimum requirements for aggregating data streams received via the respective data channels can be that the data streams share the same destination gateway 12b and a same encoding type 60, enabling the media packet circuit 48 to simply insert the raw sampled data into the media payload 94; other factors in identifying selected data streams for aggregation can include the same source device (e.g., 18, 24, or 26), the same destination device (e.g., 18', 28, or 30), or in the case of received media streams, the same media identifier (e.g., UDP source port, UDP destination port, and/or SSRC value).

The synchronous translation circuit 44 successively samples in step 124 each of the prescribed groups of bits from each of the selected data streams at the corresponding sampling interval. For example, the DSP circuit 46 successively samples in step 124 each of the prescribed groups of bits 90 from each of the selected data streams 14 at the corresponding sampling time interval (e.g., time slice "TS0") 92 using the appropriate encoding (e.g., clear mode) 60, and stores the sampled groups of bits (e.g., sampled bytes) 90 for the corresponding sampling time interval 92 in the buffer circuit 50 (in the case of media packets incoming from the local IP ports 38, the media packet generator 48 can sample the sampled groups of bits from the selected data channels 22 synchronous with the sampling time interval (e.g., time slice "TS0") 92 utilized by the DSP circuit 46). As described above with respect to FIG. 2, if the selected data channels are supplied via DS-0 links that are multiplexed within a PRI link (e.g., 14a), the interface circuit (e.g., PRI interface circuit 34) first will demultiplex the DS-0 channels from the PRI link (e.g., the T1 or E1 channel).

The media packet circuit 48 retrieves the sampled groups of bits 90 for the corresponding sampling time interval 92 in step 126, and aggregates the sampled groups of bits 90 into an IP media packet payload 94a. The media packet circuit 48 generates in step 128 the corresponding media packet 96a by adding the corresponding headers 98, 104, and 110, and sends the generated media packet 94a to the IP interface circuit 36 for output to the IP network 16 in step 130 via the egress interface 40.

The media packet 94 is routed by the IP network 16 to the destination gateway 12b based on the corresponding destination address 62 specified in the destination address field 102 of the IP header 98. In response to the egress interface 40 of the gateway 12b receiving the media packet 94a in step 132, the media packet circuit 48 of the media gateway 12b identifies in step 134 the synchronized data streams to be output via the respective data channels based on parsing the UDP header 104 and/or the media header 110, and associating the parsed values with the corresponding table entries 54 in the corresponding mapping table 52 of the gateway 12b. The media packet circuit 48 in step 136 can then sample in sequence the successive prescribed groups of bits (e.g., A0, A1, A2, A3, A4, and A5) 90 from the media packet payload 94a, and store the recovered groups of bits 90 into the buffer circuit 50, enabling the DSP circuit 46 in the gateway 12b to synchronously output in step 138 the successive prescribed groups of bits (e.g., the successive bytes) onto the respective data channels relative to the synchronous output interval (e.g., destination time slice zero "DTS0") 92. As apparent from the foregoing, outputting the synchronized data streams onto the respective data channels can be implemented on the multiplexed link 14*a* based on multiplexing the time division multiplexed data channels into the time multiplexed link 14*a* at the appropriate time interval (e.g., "DTS0"/32).

According to the example embodiments, multiple data streams can be synchronously multiplexed into a single media stream to provide synchronized delivery of data, based on inserting data from each of the selected data streams into a single media packet payload to preserve the synchronization between the data streams. Hence, use of a "raw" encoding such as "clear channel" or "G.Clear" in combination with RTP multiplexing as described herein (i.e., inserting data from each selected data stream into the single media packet payload) eliminates the need for terminal devices to employ more advanced synchronized multiplexing schemes; as such, example embodiments can provide tandem switching of video traffic for legacy terminal devices that do not support ITU-T H.244.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    receiving by a gateway a plurality of data streams via respective data channels received by the gateway, at least two of the data streams being synchronized to each other as first and second synchronized data streams, the first synchronized data stream including first successive groups of bits and the second synchronized data stream including second successive groups of bits that are synchronized with the first successive groups of bits;
    identifying by the gateway, from among the data streams, the synchronized data streams as selected data streams for aggregation based on the synchronized data streams each having a same encoding type and destined for a same destination gateway, the synchronized data streams from at least two respective data channels synchronized to each other; and
    maintaining the synchronization of the first and second successive groups of bits in the synchronized data streams by the gateway based on: successively sampling the first and second successive groups of bits as a prescribed group of bits from each of the synchronized data streams at a corresponding sampling time interval, aggregating the sampled groups of bits, having been sampled from the synchronized data streams at the corresponding sampling time interval, into a single IP media packet payload, and outputting a corresponding IP media packet, containing the IP media packet payload having the sampled groups of bits for the corresponding sampling time interval, to the destination gateway via an IP network.

2. The method of claim 1, wherein at least a group of the data channels are time division multiplexed data channels, each sampling time interval corresponding to a corresponding time slice of the time division multiplexed channels, the same encoding type identified as a clear channel encoding type.

3. The method of claim 2, wherein the time division multiplexed data channels are multiplexed within a time multiplexed link coupled to the gateway, the receiving including demultiplexing the time division multiplexed data channels from the time multiplexed link.

4. The method of claim 1, wherein the IP media packet includes a media header that identifies the encoding type, and an identifier for identifying a media channel destination.

5. The method of claim 4, wherein the identifier is a synchronization source (SSRC) identifier value, based on a prescribed call setup among the gateway and the destination gateway, that identifies aggregation of the selected data streams.

6. The method of claim 1, wherein the identifying includes identifying the selected data streams based on call setup information shared among the gateway and the destination gateway.

7. A method comprising:
    receiving, by a gateway from a source gateway via an IP network, an IP media packet having a header and an IP media packet payload;
    identifying from the IP media packet, by the gateway, synchronized data streams including at least first and second synchronized data streams to be output by the gateway via respective data channels in response to parsing the header, the first synchronized data stream having included first successive groups of bits and the second synchronized stream having included second successive groups of bits that were synchronized with the first successive groups of bits, the synchronization of the first and second successive groups of bits in the synchronized data streams having been maintained by the source gateway creating the IP media packet to include prescribed groups of bits from each of the synchronized data streams; and
    recreating synchronization between the first and second successive groups of bits in the synchronized data streams by synchronously outputting by the gateway onto the data channels the first and second successive groups of bits of the respective synchronized data streams based on: sampling in sequence successive prescribed groups of bits from the IP media packet payload, and synchronously outputting the successive prescribed groups of bits onto the respective data channels relative to a synchronous output interval, at least two of the data channels being synchronized to each other.

8. The method of claim 7, wherein at least a group of the data channels are time division multiplexed data channels, the synchronous output interval corresponding to a corresponding time slice of the time division multiplexed channels, the synchronously outputting including outputting the successive prescribed groups of bits according to a clear channel encoding type specified in the header.

9. The method of claim 8, wherein the synchronously outputting includes multiplexing the time division multiplexed data channels into a time multiplexed link coupled to the gateway.

10. The method of claim 7, wherein the IP media packet includes a media header that identifies the encoding type, and an identifier for identifying a media channel destination, the identifying including identifying the synchronized data streams based on the identifier and call setup information associating the identifier to the synchronized data streams and the respective data channels.

11. The method of claim 10, wherein the identifier is a synchronization source (SSRC) identifier value that identifies aggregation of the selected data streams.

12. The method of claim 11, wherein the synchronously outputting further includes outputting a first media packet specifying a first SSRC value on a first of the data channels and a second media packet specifying a second SSRC value on a second of the data channels, based on the call setup information.

13. An apparatus comprising:
a data channel interface circuit configured for receiving a plurality of data streams via respective data channels received by the data channel interface circuit, at least two of the data streams being synchronized to each other as first and second synchronized data streams, the first synchronized data stream including first successive groups of bits and the second synchronized data stream including second successive groups of bits that are synchronized with the first successive groups of bits;
an IP interface circuit configured for outputting an IP media packet to a destination gateway via an IP network; and
a synchronous translation circuit configured for identifying, from among the data streams, the synchronized data streams as selected data streams for aggregation based on the synchronized data streams each having a same encoding type and destined for the destination gateway, the synchronized data streams from at least two respective data channels synchronized to each other, and further configured for maintaining the synchronization of the first and second successive groups of bits in the synchronized data streams based on successively sampling the first and second successive groups of bits as a prescribed group of bits from each of the synchronized data streams at a corresponding sampling time interval, aggregating the sampled groups of bits having been sampled from the synchronized data streams at the corresponding sampling time interval into a single IP media packet payload, and generating the IP media packet, containing the IP media packet payload having the sampled groups of bits for the corresponding sampling time interval, for output by the IP interface circuit to the destination gateway via the IP network.

14. The apparatus of claim 13, wherein the data channel interface circuit is configured for receiving at least a group of the data channels as time division multiplexed data channels, each sampling time interval corresponding to a corresponding time slice of the time division multiplexed channels, the same encoding type identified as a clear channel encoding type.

15. The apparatus of claim 14, wherein the time division multiplexed data channels are multiplexed within a time multiplexed link coupled to the data channel interface circuit, the data channel interface circuit configured for demultiplexing the time division multiplexed data channels from the time multiplexed link.

16. The apparatus of claim 13, wherein the IP media packet includes a media header that identifies the encoding type, and an identifier for identifying a media channel destination.

17. The apparatus of claim 16, wherein the identifier is a synchronization source (SSRC) identifier value, based on a prescribed call setup among the gateway and the destination gateway, that identifies aggregation of the selected data streams.

18. The apparatus of claim 13, further comprising a mapping table circuit configured for storing call setup information, the synchronous translation circuit configured for identifying the selected data streams based on the stored call setup information.

19. An apparatus comprising:
an IP interface circuit configured for receiving, from a source gateway via an IP network, an IP media packet having a header and an IP media packet payload;
a synchronous translation circuit configured for identifying, from the IP media packet, synchronized data streams including at least first and second synchronized data streams to be output via respective data channels in response to parsing the header, the first synchronized data stream having included first successive groups of bits and the second synchronized stream having included second successive groups of bits that were synchronized with the first successive groups of bits, the synchronization of the first and second successive groups of bits in the synchronized data streams having been maintained by the source gateway creating the IP media packet to include prescribed groups of bits from each of the synchronized data streams, the synchronous translation circuit further configured for recreating synchronization between the first and second successive groups of bits in the synchronized data streams by sampling in sequence successive prescribed groups of bits from the IP media packet payload, and synchronously supplying the successive prescribed groups of bits for output onto the respective data channels relative to a synchronous output interval; and
a data channel interface circuit configured for synchronously outputting onto the data channels the first and second successive groups of bits of the respective synchronized data streams relative to the synchronous output interval, at least two of the data channels being synchronized to each other.

20. The apparatus of claim 19, wherein at least a group of the data channels are time division multiplexed data channels, the synchronous output interval corresponding to a corresponding time slice of the time division multiplexed channels, the data channel interface circuit configured for outputting the successive prescribed groups of bits according to a clear channel encoding type specified in the header.

21. The apparatus of claim 20, wherein the data channel interface circuit is configured for multiplexing the time division multiplexed data channels into a time multiplexed link coupled to the gateway.

22. The apparatus of claim 19, wherein the IP media packet includes a media header that identifies the encoding type, and an identifier for identifying a media channel destination, the synchronous translation circuit configured for identifying the synchronized data streams based on the identifier and call setup information associating the identifier to the synchronized data streams and the respective data channels.

23. The apparatus of claim 22, wherein the identifier is a synchronization source (SSRC) identifier value that identifies aggregation of the selected data streams.

24. The apparatus of claim 23, wherein the synchronous translation circuit is configured for generating a first media packet specifying a first SSRC value for output on a first of the data channels and a second media packet specifying a second SSRC value for output on a second of the data channels, based on the call setup information.

25. An apparatus comprising:
means for receiving a plurality of data streams via respective data channels received by the means for receiving, at least two of the data streams being synchronized to each other as first and second synchronized data streams, the first synchronized data stream including first successive groups of bits and the second synchronized data stream including second successive groups of bits that are synchronized with the first successive groups of bits;
means for outputting an IP media packet to a destination gateway via an IP network; and means for identifying, from among the data streams, the synchronized data streams as selected data streams for aggregation based on the synchronized data streams each having a same encoding type and destined for the destination gateway, the synchronized data streams from at least two respective data channels synchronized to each other, and the means for identifying further configured for maintaining the synchronization of the first and second successive groups of bits in the synchronized data streams based on successively sampling the first and second successive groups of bits as a prescribed group of bits from each of the synchronized data streams at a corresponding sampling time interval, aggregating the sampled groups of bits having been sampled from the synchronized data streams at the corresponding sampling time interval into a single IP media packet payload, and generating the IP media packet, containing the IP media packet payload having the sampled groups of bits for the corresponding sampling time interval, for output by the means for outputting to the destination gateway via the IP network.

26. An apparatus comprising:

means for receiving, from a source gateway via an IP network, an IP media packet having a header and an IP media packet payload;

means for identifying, from the IP media packet, synchronized data streams including at least first and second synchronized data streams to be output via respective data channels in response to parsing the header, the first synchronized data stream having included first successive groups of bits and the second synchronized stream having included second successive groups of bits that were synchronized with the first successive groups of bits, the synchronization of the first and second successive groups of bits in the synchronized data streams having been maintained by the source gateway creating the IP media packet to include prescribed groups of bits from each of the synchronized data streams, the means for identifying further configured for recreating synchronization between the first and second successive groups of bits in the synchronized data streams by sampling in sequence successive prescribed groups of bits from the IP media packet payload, and synchronously supplying the successive prescribed groups of bits for output onto the respective data channels relative to a synchronous output interval; and means for synchronously outputting onto the data channels the first and second successive groups of bits of the respective synchronized data streams relative to the synchronous output interval, at least two of the data channels being synchronized to each other.

\* \* \* \* \*